(12) United States Patent
Gao et al.

(10) Patent No.: US 12,072,384 B2
(45) Date of Patent: Aug. 27, 2024

(54) METHOD FOR DISPLAYING INFORMATION OF BATTERY PACK BASED ON MOBILE TERMINAL

(71) Applicant: Positec Power Tools (Suzhou) Co., Ltd, Suzhou (CN)

(72) Inventors: Don Zhendong Gao, Jiangsu (CN); Xiaoyong Chen, Jiangsu (CN)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 701 days.

(21) Appl. No.: 16/767,079

(22) PCT Filed: Nov. 23, 2018

(86) PCT No.: PCT/CN2018/117214
§ 371 (c)(1),
(2) Date: May 26, 2020

(87) PCT Pub. No.: WO2019/101168
PCT Pub. Date: May 31, 2019

(65) Prior Publication Data
US 2020/0393516 A1    Dec. 17, 2020

(30) Foreign Application Priority Data
Nov. 27, 2017   (CN) .......................... 201711208459.0

(51) Int. Cl.
*G01R 31/371*      (2019.01)
*G01R 31/382*      (2019.01)
(Continued)

(52) U.S. Cl.
CPC ......... *G01R 31/371* (2019.01); *G01R 31/382* (2019.01); *G06Q 20/322* (2013.01);
(Continued)

(58) Field of Classification Search
None
See application file for complete search history.

(56) References Cited

U.S. PATENT DOCUMENTS 9,233,457 B2    1/2016   Wanek et al.
9,466,198 B2 *  10/2016  Burch ...................... G05F 1/66
(Continued)

FOREIGN PATENT DOCUMENTS

CN   101282381 A   10/2008
CN   105398406 A   3/2016
(Continued)

*Primary Examiner* — Roy Y Yi
(74) *Attorney, Agent, or Firm* — Lee & Hayes, P.C.

(57) ABSTRACT

The present invention relates to a method for displaying information of a battery pack based on a mobile terminal. The battery pack is used to supply electric energy to an electric tool. The method includes: establishing wireless communication with the battery pack; acquiring status information of the battery pack; and displaying the status information on the mobile terminal according to the acquired status information. In this way, as long as a user carries a mobile terminal that wirelessly communicates with a battery pack, status information of the battery pack can be displayed. The operation manner is simple, convenient, and easy to realize, which improves user experience.

19 Claims, 5 Drawing Sheets

(51) Int. Cl.
*G06Q 20/32* (2012.01)
*H01M 10/42* (2006.01)
*H01M 10/48* (2006.01)
*H02J 7/00* (2006.01)

(52) U.S. Cl.
CPC ......... *H01M 10/48* (2013.01); *H01M 10/488* (2013.01); *H02J 7/00032* (2020.01); *H02J 7/0048* (2020.01); *H01M 2010/4278* (2013.01); *H01M 2220/30* (2013.01)

(56) References Cited

U.S. PATENT DOCUMENTS

| | | | |
|---|---|---|---|
| 9,726,763 B2* | 8/2017 | Dempsey | H01M 10/488 |
| 9,908,182 B2 | 3/2018 | Phillips et al. | |
| 2012/0312570 A1 | 12/2012 | Wanek et al. | |
| 2014/0151079 A1* | 6/2014 | Furui | B25F 5/00 |
| | | | 173/171 |
| 2014/0367134 A1 | 12/2014 | Phillips et al. | |
| 2015/0372518 A1 | 12/2015 | Toya et al. | |
| 2016/0006085 A1 | 1/2016 | Toya | |
| 2018/0154456 A1 | 6/2018 | Phillips et al. | |

FOREIGN PATENT DOCUMENTS

| | | | |
|---|---|---|---|
| CN | 102666024 B | 6/2016 | |
| CN | 106776211 A | 5/2017 | |
| CN | 106329013 B | 1/2019 | |
| DE | 102009047443 A1 | 6/2011 | |
| JP | 6227122 B2 | 11/2017 | |
| WO | 2011/067066 A1 | 6/2011 | |
| WO | 2013/116303 A1 | 8/2013 | |
| WO | 2015/159431 A1 | 10/2015 | |

\* cited by examiner

METHOD FOR DISPLAYING INFORMATION OF BATTERY PACK BASED ON MOBILE TERMINAL

This application is a National Stage Application of International Application No. PCT/CN2018/117214, filed on Nov. 23, 2018, which claims benefit of and priority to Chinese Patent Application No. 201711208459.0, filed on Nov. 27, 2017, all of which are hereby incorporated by reference in their entirety for all purposes as if fully set forth herein.

BACKGROUND

Technical Field

The present invention relates to the field of battery technologies, and in particular, to a method for displaying information of a battery pack based on a mobile terminal and a mobile terminal.

Related Art

In the field of electric tools, a battery pack is a common power supply device that can make an electric tool more convenient to use and portable.

In the prior art, some battery packs do not have a charge level display function, making it impossible for a user to know a remaining charge level of a battery pack. A user may take a battery pack outdoors to work, but the battery pack is completely drained soon and needs to be recharged, which brings trouble to the user. In the prior art, some battery packs are provided with a control button and a charge level indicator to show a quantity of charge bars. A user can trigger the control button to make the battery pack show a current charge level. However, in such a method for displaying a charge level of a battery pack, a user needs to manually trigger a control button to display a charge level of a battery pack, leading to inconvenient operations, and a charge level is displayed imprecisely. Only the charge level of the battery pack can be display by using the foregoing method, and a user cannot obtain other information of the battery pack, leading to poor user experience.

SUMMARY

To overcome the defects of the prior art, a problem to be solved in the present invention is to provide a method for displaying information of a battery pack based on a mobile terminal to display information of a battery pack through a mobile terminal device.

Technical solutions adopted by the present invention to solve existing technical problems are as follows.

A method for displaying information of a battery pack based on a mobile terminal, the battery pack being used to supply electric energy to an electric tool, the method comprises: establishing wireless communication with the battery pack; acquiring status information of the battery pack; and displaying the status information on the mobile terminal according to the acquired status information.

In one embodiment, the status information of the battery pack comprises a remaining charge level of the battery pack, and the step of displaying the status information on the mobile terminal comprises: displaying the remaining charge level of the battery pack on the mobile terminal.

In one embodiment, before the displaying the status information on the mobile terminal, the method further comprises: determining whether the remaining charge level of the battery pack is less than or equal to a first preset charge level; and if yes, displaying the remaining charge level of the battery pack on the mobile terminal.

In one embodiment, the method comprises: when the remaining charge level of the battery pack is less than or equal to a second preset charge level, outputting, by the mobile terminal, prompt information, the prompt information indicating that the battery pack is currently in a low charge level state.

In one embodiment, the prompt information comprises an audio signal or a low-frequency vibration signal.

In one embodiment, the acquiring status information of the battery pack comprises: calculating, by a battery pack charge level calculation module, the remaining charge level of the battery pack, and every time the remaining charge level decreases by a preset value, correspondingly outputting a remaining charge level signal once and transmitting the remaining charge level signal to a battery pack control module; and receiving, by the battery pack control module, the remaining charge level signal, and transmitting the remaining charge level signal to the mobile terminal by wireless transmission.

In one embodiment, the acquiring status information of the battery pack comprises: acquiring a remaining charge level of the battery pack at a preset frequency.

In one embodiment, the step of displaying the remaining charge level of the battery pack on the mobile terminal comprises: representing the remaining charge level of the battery pack with a plurality of bars or with a percentage on the mobile terminal.

In one embodiment, the status information of the battery pack comprises at least one of the temperature of the battery pack, a quantity of times of charge or discharge, and the remaining life of the battery pack.

In one embodiment, the status information of the battery pack comprises a remaining capacity of the battery pack, the remaining capacity is a remaining operating time and/or a quantity of remaining operations of repeating operation under a working condition according to the remaining charge level of the battery pack, and the method further comprises: acquiring, by the battery pack, load information of the electric tool connected to the battery pack during operation; calculating, by the battery pack, the remaining capacity of the battery pack according to the remaining charge level and the load information and transmitting the remaining capacity to the mobile terminal; and displaying the remaining capacity on the mobile terminal.

In one embodiment, the status information of the battery pack comprises a remaining operating time of the battery pack, and the method further comprises: acquiring remaining charge levels of the battery pack at regular intervals; calculating a consumption rate of a charge level of the battery pack under a working condition, and calculating the remaining operating time of the battery pack; and displaying the remaining operating time of the battery pack on the mobile terminal.

In one embodiment, the method further comprising: when it is determined that the mobile terminal disconnects wireless communication from the battery pack, recording, by the battery pack, a current location and time information and transmitting the current location and the time information to the mobile terminal.

In one embodiment, the method further comprising: presetting a safe distance between the battery pack and the mobile terminal, and when a distance between the battery pack and the mobile terminal is greater than the safe distance, outputting a prompt message through the mobile terminal.

In one embodiment, the method further comprising: sending, by the mobile terminal, configuration information of the battery pack to the battery pack by wireless transmission; and performing, by the battery pack software upgrade of the battery pack or parameter replacement of the battery pack according to the received configuration information.

In one embodiment, the battery pack is electrically connected to the electric tool, and the method further comprises: acquiring, by the battery pack, attribute information of the electric tool; transmitting, by the battery pack, the acquired attribute information of the electric tool to the mobile terminal; and displaying the attribute information on the mobile terminal.

In one embodiment, the method further comprising: sending, by the mobile terminal, an electric tool control parameter to the battery pack; and receiving, by the battery pack, the control parameter transmitted by the mobile terminal, and transmitting the control parameter to the electric tool connected to the battery pack, for controlling the electric tool.

In one embodiment, the configuration information comprises at least one of locking information that keeps the battery pack or the electric tool in a locked state and unlocking information that keeps the battery pack or the electric tool in an unlocked state.

In one embodiment, the method further comprising: acquiring, by the mobile terminal, use data of the battery pack or the electric tool connected to the battery pack, and providing a user with a use recommendation according to the use data; and displaying the use recommendation on the mobile terminal.

In one embodiment, the method further comprising: acquiring, by the mobile terminal, model or parameter information of the battery pack or the electric tool connected to the battery pack, and acquiring a purchase step of an accessory of the battery pack or the electric tool according to the model or parameter information; and displaying the purchase step on the mobile terminal.

In one embodiment, the step of acquiring, by the mobile terminal, use data of the battery pack or the electric tool connected to the battery pack, and providing a user with a use recommendation according to the use data comprises: acquiring, by the mobile terminal, the use data of the battery pack or the electric tool connected to the battery pack, and transmitting the use data to a cloud server; and analyzing, by the cloud server, the acquired use data, providing the user with a use recommendation, and transmitting the use recommendation to the mobile terminal.

In one embodiment, the step of acquiring, by the mobile terminal, model or parameter information of the battery pack or the electric tool connected to the battery pack, and acquiring a purchase step of an accessory of the battery pack or the electric tool according to the model or parameter information comprises: acquiring, by the mobile terminal, the model or parameter information of the battery pack or the electric tool connected to the battery pack, and transmitting the model or parameter information to a cloud server; and analyzing, by the cloud server, an acquired model or parameter, acquiring the purchase step of the accessory of the battery pack or the electric tool, and transmitting the purchase step to the mobile terminal.

The present invention further provides a mobile terminal, including: a memory, a processor, and a computer program stored in the memory and executable by the processor, where the program is executed by the processor to implement the foregoing method for displaying information of a battery pack based on a mobile terminal.

The present invention further provides a computer readable storage medium, storing a computer program, where the program is executed by a processor to implement the foregoing method for displaying information of a battery pack.

In one embodiment, the present invention further provides a method for displaying information of a battery pack, applied to a battery pack having a display component and a wireless communications component, where the method for displaying information of a battery pack includes: establishing wireless communication with a terminal through the wireless communications component; and when it is determined that a distance from the terminal is less than or equal to a first threshold, controlling the display component to automatically display status information of the battery pack.

In one embodiment, before the controlling the display component to automatically display status information of the battery pack, the method further comprises: determining that an on-status information display instruction sent by the terminal is acquired.

In one embodiment, before the establishing wireless communication with a terminal through the wireless communications component, the method further comprises: determining that the terminal is any terminal in a matching terminal list; or determining that a connection password sent by the terminal is valid.

In one embodiment, the determining that a distance from the terminal is less than or equal to a first threshold comprises: determining, according to a received wireless signal strength sent by the terminal, that the distance from the terminal is less than or equal to the first threshold.

In one embodiment, the method further comprising: if the distance from the terminal is greater than the first threshold, controlling the display component to display the status information of the battery pack at intervals at a preset frequency; or, if the distance from the terminal is greater than the first threshold, controlling the display component to sleep, and when it is determined that the status information of the battery pack is updated, waking up the display component to automatically display the updated status information of the battery pack.

In one embodiment, the method further comprising: turning off the display component when it is determined that the distance from the terminal is greater than a second threshold.

In one embodiment, before the controlling the display component to automatically display status information of the battery pack, the method further comprises: determining a current operating state of the battery pack; and determining a target display mode of the display component according to the current operating state; and the controlling the display component to automatically display status information of the battery pack comprises: controlling, according to the target display mode, the display component to automatically display the status information of the battery pack.

In one embodiment, after the establishing wireless communication with a terminal through the wireless communications component, the method further comprises: sending the status information of the battery pack to the terminal through the wireless communications component.

In one embodiment, after the establishing wireless communication with a terminal through the wireless communications component, the method further comprises: acquiring configuration information sent by the terminal; and configuring the battery pack according to the configuration information.

In one embodiment, after the establishing wireless communication with a terminal through the wireless communications component, the method further comprises: acquiring attribute information of an electric tool electrically connected to the battery pack; and sending the attribute information of the electric tool to the terminal.

In one embodiment, after the sending the attribute information of the electric tool to the terminal, the method further comprises: acquiring an electric tool control parameter sent by the terminal; and sending the electric tool control parameter to the electric tool electrically connected to the battery pack.

In one embodiment, the battery pack further comprises a control button; and the method for displaying information of a battery pack further comprises: when it is determined that the control button is triggered, controlling the display component to display the status information of the battery pack. Compared with the prior art, beneficial effects of the present embodiment are as follows: The present embodiment implements precise display of a charge level of a battery pack and remote control of the battery pack by displaying status information of the battery pack through a mobile terminal.

BRIEF DESCRIPTION OF THE DRAWINGS

The objectives, technical solutions, and beneficial effects of the present invention described above can be achieved through the following accompanying drawings.

DETAILED DESCRIPTION

Exemplary embodiments are described in detail here, and examples are shown in the accompanying drawings. When the accompanying drawings are involved in the following descriptions, unless otherwise indicated, identical numbers in different accompanying drawings represent identical or similar elements. Implementations described in the following exemplary embodiments do not represent all implementations consistent with the present invention. Instead, the implementations are only examples of devices and methods as detailed in the appended claims and consistent with some aspects of the present invention.

In an existing method for displaying a charge level of a battery pack, a user needs to manually trigger a control button mounted on a battery pack to display a charge level of the battery pack, leading to problems of inconvenient operations and poor user experience. In view of this, a method for displaying information of a battery pack based on a mobile terminal is provided in embodiments of the present invention.

Figure 1:
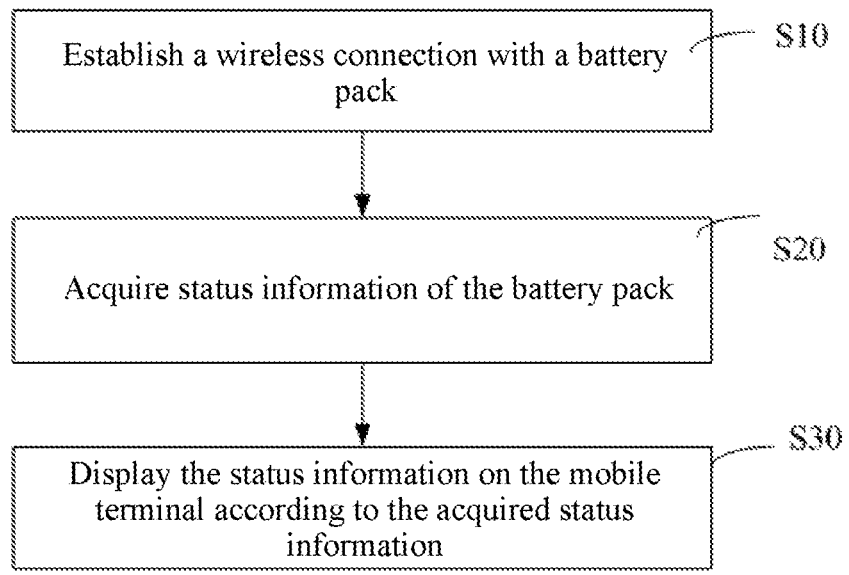
FIG. 1 is a schematic flowchart of a method for displaying information of a battery pack based on a mobile terminal according to a first embodiment of the present invention.

FIG. 1 is a schematic flowchart of a method for displaying information of a battery pack based on a mobile terminal according to a first embodiment of the present invention. The method includes the following steps.

Step S10: Establish wireless communication with a battery pack.

Step S20: Acquire status information of the battery pack.

Step S30: Display the status information on the mobile terminal according to the acquired status information.

In the present embodiment, a battery pack wirelessly communicates with a mobile terminal to transmit status information of the battery pack, and the status information of the battery pack is displayed on a display screen of the mobile terminal. In this embodiment, remote control and display of information of a battery pack by a mobile terminal are implemented, making it convenient for a user to know the usage of the battery pack in time.

Figure 2:
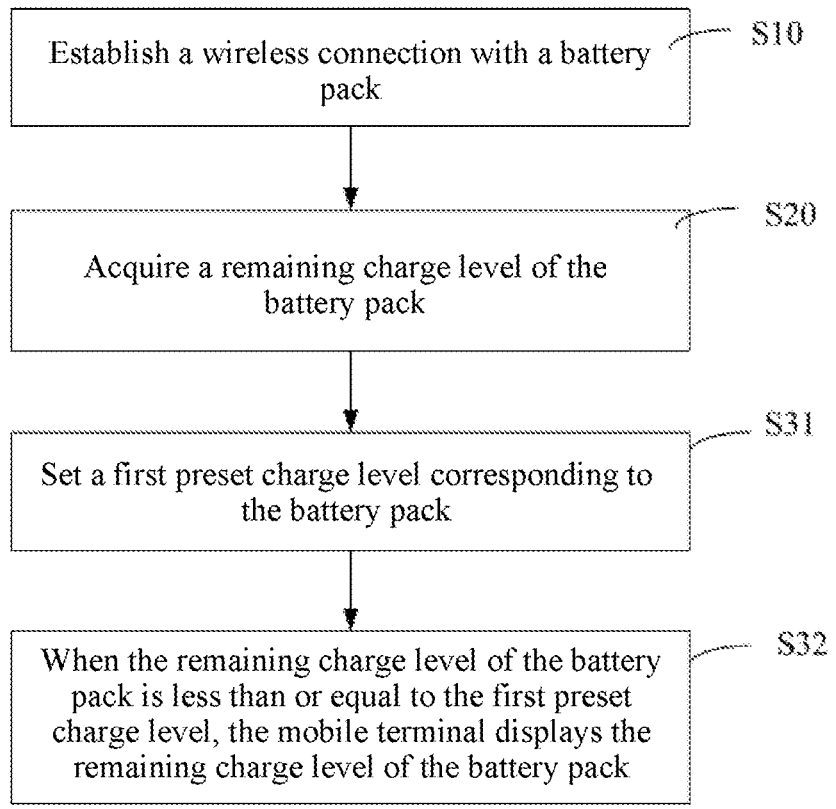
FIG. 2 is a schematic flowchart of a method for displaying information of a battery pack based on a mobile terminal according to a second embodiment of the present invention.

FIG. 2 is a schematic flowchart of a method for displaying information of a battery pack based on a mobile terminal according to a second embodiment of the present invention. Status information of a battery pack includes a remaining charge level of the battery pack. The method includes the following steps.

Step S10: Establish wireless communication with a battery pack.

Step S20: Acquire remaining charge level of the battery pack.

Step S31: Set a first preset charge level corresponding to the battery pack.

Step S32: When the remaining charge level of the battery pack is less than or equal to the first preset charge level, the mobile terminal displays the remaining charge level of the battery pack.

The first preset charge level herein is a trigger point at which the mobile terminal starts to display a charge level of the battery pack. The mobile terminal turns on a charge level display function only when the remaining charge level of the battery pack is equal to the first preset charge level. A person skilled in the art may know that the present embodiment is not limited to that the mobile terminal turns on charge level display only when the remaining charge level reaches the first preset charge level. For example, the mobile terminal may acquire remaining charge levels of the battery pack at regular intervals. After acquiring the remaining charge levels, the mobile terminal may display in time a remaining charge level of the battery pack acquired most recently. The mobile terminal displays the remaining charge level of the battery pack only when the acquired remaining charge level of the battery pack reaches the first preset charge level. Certainly, a user can also manually query a current remaining charge level of the battery pack on the mobile terminal to acquire a remaining charge level a period of time earlier to learn the usage of the battery pack.

In the foregoing embodiment, when the remaining charge level of the battery pack is greater than the first preset charge level, the remaining charge level of the battery pack is not displayed on a display screen of the mobile terminal. When the remaining charge level of the battery pack is equal to the first preset charge level, the mobile terminal starts to display the remaining charge level of the battery pack to avoid that when the remaining charge level of the battery pack is high, the mobile terminal such as a mobile phone displays the remaining charge level of the battery pack for a long time to affect the use of the mobile phone by the user and cause unnecessary trouble to the user.

In the foregoing embodiment, the method further includes:

when the remaining charge level of the battery pack is less than or equal to a second preset charge level, outputting, by the mobile terminal, prompt information, the prompt information indicating that the battery pack is currently in a low charge level state.

The second preset charge level herein may be a critical value for determining the low charge level state of the battery pack or a value slightly higher than the critical value. Before the battery pack enters the low charge level state, the remaining charge level is displayed in advance to prompt the user that the battery pack needs to be recharged or replaced. To better prompt the user, in the present embodiment, when the remaining charge level is less than or equal to the second preset charge level, prompt information is output, the prompt information indicating that the battery pack is currently in a low charge level state. The prompt information includes an audio signal or a low-frequency vibration signal. For example, a prompt box pops up on the display screen of the mobile terminal to prompt a corresponding remaining charge level, or at the same time, a speaker may output a voice message to prompt the corresponding remaining charge level or a vibrator vibrates to make a prompt. Preferably, the prompt box popping up on the display screen of the mobile terminal flashes to prompt the corresponding remaining charge level.

In the foregoing embodiment, the step of acquiring status information of the battery pack includes:

calculating, by a battery pack charge level calculation module, the remaining charge level of the battery pack, and every time the remaining charge level decreases by a preset value, correspondingly outputting a remaining charge level signal once and transmitting the remaining charge level signal to a battery pack control module; and receiving, by the battery pack control module, the remaining charge level signal, and transmitting the remaining charge level signal to the mobile terminal by wireless transmission.

In the present embodiment, the step of acquiring status information of the battery pack may alternatively include: calculating, by a battery pack charge level calculation module, the remaining charge level represented by a plurality of bars of the battery pack, and every time the remaining charge level decreases by one bar, correspondingly outputting a remaining charge level signal once and transmitting the remaining charge level signal to a battery pack control module; and receiving, by the battery pack control module, the remaining charge level signal, and outputting a corresponding image display signal to a display screen of the terminal.

In the foregoing embodiments, a prompt box may pop up on the display screen of the mobile terminal to prompt a corresponding remaining charge level, or at the same time, a speaker may output a voice message to prompt the corresponding remaining charge level or a vibrator vibrates to make a prompt.

In the foregoing embodiments, the prompt box popping up on the display screen of the mobile terminal flashes to prompt the corresponding remaining charge level. When a battery voltameter calculates that the charge level of the battery pack has been reduced to a charge level limit, a reminder signal is correspondingly outputted. After receiving the reminder signal, the mobile terminal outputs an audio signal to the speaker or a low-frequency vibration signal to the speaker.

To provide the present embodiment with better beneficial effects, the following step may further be included.

When the battery voltameter calculates that the remaining charge level has decreased to the last bar, the battery pack control module outputs a voice signal which is transmitted to the speaker of the terminal by wireless transmission to remind that the battery pack needs to be charged.

In the present embodiment, to precisely display the remaining charge level of the battery pack, the remaining charge level of the battery pack may be calculated by a battery voltameter and represented by a percentage, and every time the remaining charge level decreases by 1%, a remaining charge level signal is correspondingly output. A person skilled in the art may know that the remaining charge level of the battery pack is calculated by the battery voltameter and is represented by a percentage, and every time the remaining charge level decreases by 1%, a remaining charge level signal is correspondingly output once and transmitted to a battery pack charge level control module. The battery pack charge level control module receives the remaining charge level signal and outputs a corresponding image display signal to the display screen of the terminal.

In the foregoing embodiments, a quantity of bars of the remaining charge level is displayed in the form of a battery graph, the charge level is displayed in the form of a percentage, the remaining charge level is distinguished by colors, or the charge level is represented by dotted and solid lines. The dotted line represents a missing charge level of the battery pack, and the solid line represents an actual charge level of the battery pack. In this way, the user can view the usage of the charge level of the battery pack on the display screen of the mobile terminal.

A person skilled in the art may know that the mobile terminal may acquire remaining charge levels of the battery pack at regular intervals, and after acquiring the remaining charge levels, the mobile terminal can display in time a remaining charge level of the battery pack acquired most recently, or the user manually queries the remaining charge level of the battery pack.

In the foregoing embodiments, the status information of the battery pack further includes information such as the temperature of the battery pack, a quantity of times of charge or discharge, and the remaining life of the battery pack. The user can know the current temperature of the battery pack and learn the use time of the battery pack through the mobile terminal, to prevent the temperature of the battery pack from becoming excessively high, thereby protecting the service life of the battery pack from impact.

In the present embodiment, the mobile terminal can display both the remaining charge level of the battery pack and whether the battery pack is a new battery pack. For example, the user can learn the usage of the battery pack through the quantity of times of charge or discharge of the battery pack, and then determine the service life and discharging efficiency of the battery pack. When the user mounts the battery pack to a tool body, it is likely that the battery pack does not operate or stop operating after a short time. In this case, the user is not sure whether the tool fails or whether the battery pack is fully discharged. In the present embodiment, the mobile terminal can display the quantity of times of charge or discharge of the battery pack. The user can learn the usage of the battery pack through the quantity of times of charge or discharge, and determine the battery pack as an old battery pack according to the quantity of times of charge or discharge, that is, the battery pack is fully discharged, so as to exclude that the electric tool is faulty and fails to operate.

In the foregoing embodiments of the present invention, a discharge curve of the battery pack may also be displayed on the display screen of the mobile terminal. Specifically, the mobile terminal acquires information of a remaining charge level of the battery pack at a moment and a time corresponding to the remaining charge level and stores the acquired remaining charge level and time. A discharge curve is made according to the information of remaining charge levels at different times and is displayed through the display screen of the mobile terminal. The discharge curve shows a relationship between a discharge voltage of the battery pack and the time. A remaining voltage of the battery pack gradually and slowly decreases in the beginning. The slope of the curve rapidly increases after the remaining voltage decreases to a point, and the voltage rapidly decreases. In addition, a voltage decrease slope of a new battery pack is less than that of an old battery pack. The user can observe the discharge curve of the battery pack to know the condition of the battery pack.

From the discharge curve of the battery pack, the user can also learn a voltage decrease of the battery pack in a period of time, so as to estimate the remaining time that the battery pack can last.

The mobile terminal may also display a remaining capacity of the battery pack. The remaining capacity is a remaining operating time and/or quantity of remaining operations of repeating operation under a working condition according to the remaining charge level of the battery pack, and the method further includes:

acquiring, by the battery pack, load information of the electric tool connected to the battery pack during operation;

calculating, by the battery pack, the remaining capacity of the battery pack according to the remaining charge level of the battery pack and the load information and transmitting the remaining capacity to the mobile terminal; and displaying the remaining capacity of the battery pack on the mobile terminal.

In one embodiment, the mobile terminal may selectively display at least one of a remaining operating time and a quantity of remaining operations of a power source according to the type of the electric tool. For example, for an electric tool such as an electric drill or an electric wrench, according to the remaining charge level, the mobile terminal may display a quantity of holes that can still be drilled or a quantity of screws that can still be fixed. The user can directly learn a quantity of screws to be fixed according to the battery pack in such a working condition of repeated screw fixing. For an electric tool such as a mower or a hair dryer, the mobile terminal can display the time that the remaining charge level can continue to operate for repeating operation under a working condition. The user can directly learn the time that the remaining charge level of the battery pack can last, so as to replace the battery pack in time and improve work efficiency.

In an embodiment of the present invention, the mobile terminal may selectively display a remaining operating time or a quantity of remaining operations of the battery pack. In an embodiment, the user may set the mobile terminal as required to enable the mobile terminal to display the remaining operating time or the quantity of remaining operations of the battery pack. In another embodiment, the mobile terminal may communicate with an electric tool and automatically identify the type of the electric tool. If the electric tool is a first electric tool, a remaining operating time of the battery pack is automatically displayed. If the electric tool is a second electric tool, a quantity of remaining operations of the battery pack is automatically displayed.

Figure 3:
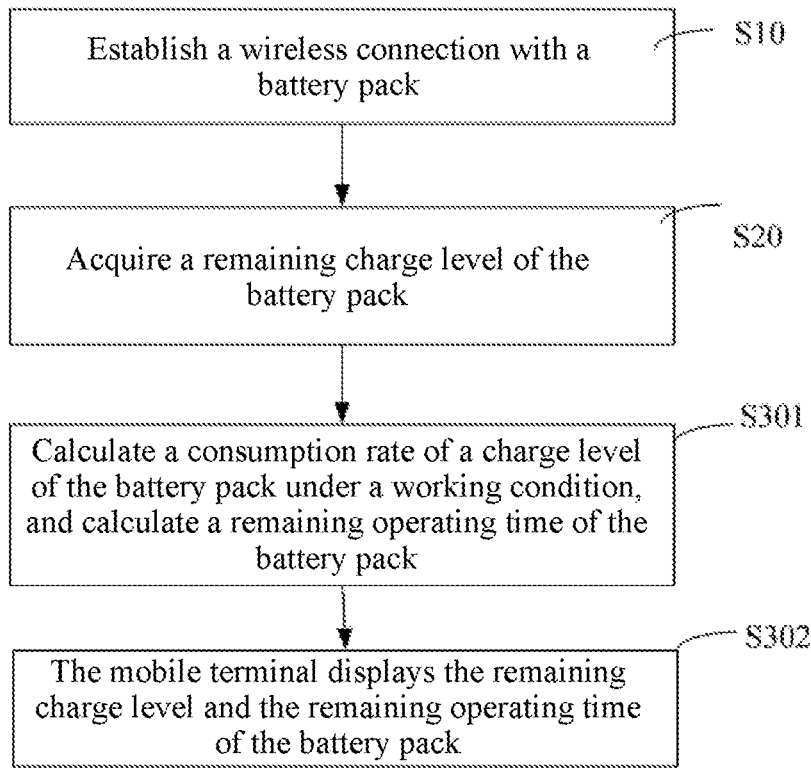
FIG. 3 is a schematic flowchart of a method for displaying information of a battery pack based on a mobile terminal according to a third embodiment of the present invention.

In a third embodiment of the present invention, the status information of the battery pack includes a remaining charge level and a remaining operating time of the battery pack. Referring to FIG. 3, the method of the present embodiment includes the following steps.

Step S10: Establish wireless communication with a battery pack.

Step S20: Acquire a remaining charge level of the battery pack. In this embodiment, the remaining charge level of the battery pack is acquired at a predetermined time interval.

Step S301: Calculate a consumption rate of a charge level of the battery pack under a working condition, and calculate a remaining operating time of the battery pack.

Step S302: The mobile terminal displays the remaining charge level and the remaining operating time of the battery pack.

In the present embodiment, the mobile terminal may selectively display at least one of the remaining charge level, the remaining operating time, and the quantity of remaining operations of the battery pack as required. For a user with little or no experience, a remaining operating time or a quantity of remaining operations of a power source is displayed to make it convenient for the user to plan workload in advance or prepare enough power packs in advance, so as to avoid that the user cannot estimate the remaining operating time even if the user knows the remaining charge level to cause an unnecessary waste of time, thereby improving work efficiency.

In the foregoing embodiments of the present invention, a category of the status information of the battery pack is displayed on a main page of the mobile terminal. The category includes a status information display sub-category and a setting sub-category. The status information display sub-category includes a remaining charge level, a discharge curve, a remaining operating time, and a quantity of remaining operations of the battery pack. The user can choose to display at least one of the remaining charge level, the discharge curve, the remaining operating time, and the quantity of remaining operations of the battery pack through the status information display sub-category. The user can also use the setting sub-category to set a manner in which the mobile terminal displays the remaining charge level of the battery pack. For example, after the mobile terminal wirelessly communicates with the battery pack, the mobile terminal displays an acquired charge level of the battery pack in real time or displays a charge level of the battery pack once in a preset period of time or the mobile terminal starts to display the remaining charge level of the battery pack when the charge level of the battery pack decreases to a first preset value. A manner of prompting a charge level may also be set through the setting sub-category. The user may be reminded of the remaining charge level of the battery pack by selecting at least one of the following manners: displaying the remaining charge level on the screen of the mobile terminal, providing a reminder through an audio signal by the mobile terminal, and providing a reminder through a low-frequency vibration signal by the mobile terminal.

In the foregoing embodiments, the user may further use the setting sub-category to select that the mobile terminal displays the remaining charge level of the battery pack when the charge level of the battery pack reaches 50% and that the mobile terminal provides a reminder through an audio signal when the remaining charge level reaches a charge level limit. According to the method, when the charge level of the battery pack is very high, the mobile terminal does not display the charge level, but the mobile terminal displays the charge level after the remaining charge level of the battery pack is 50%, thereby avoid that other operations of the user are affected and trouble is caused to the user because the mobile terminal continuously display the charge level when the remaining charge level is excessively high. In addition, when the remaining charge level of the battery pack reaches a charge level limit, the user is reminded by voice, thereby solving the problems that a remaining charge level of a conventional battery pack cannot be acquired or a remaining charge level of a battery pack can be acquired only by manually pressing a button on the battery pack, and when the remaining charge level of the battery pack reaches a charge level limit, discharging cannot be stopped in time, to affect the service life of the battery pack.

In the foregoing embodiments, the mobile terminal includes a smart mobile device such as a mobile phone and a tablet computer. The mobile terminal establishes wireless communication with the battery pack. The wireless communication is a communication manner other than wired communication, including Near Field Communication (NFC), Wireless Fidelity (Wi-Fi) transmission, and Bluetooth transmission. For example, a control device in the battery pack wirelessly communicates with the mobile terminal by Bluetooth, Wi-Fi or NFC, and transmits the status information of the battery pack to the mobile terminal. The status information of the battery pack is displayed on a display screen of the mobile terminal. For the NFC, when the mobile terminal is very close to the battery pack, the battery pack and the mobile terminal transmit data. The status information of the battery pack, for example, status information such as a remaining charge level, a remaining operating time, a temperature, a quantity of times of charge or discharge, and the remaining life of the battery pack, is transmitted to the mobile terminal. The mobile terminal displays the received information in a preset display manner. For the Wi-Fi communication, when the battery pack and the mobile terminal are both within a Wi-Fi signal range, the mobile terminal and the battery pack wirelessly transmit data, and the mobile terminal displays the received status information of the battery pack in a preset display manner. When the mobile terminal is a mobile phone, the mobile phone can wirelessly communicate with the battery pack. The mobile phone receives the status information of the battery pack and displays the status information of the battery pack in a preset display manner.

Specifically, a mobile phone is used as an example. The mobile phone wirelessly communicates with the battery pack by Bluetooth, Wi-Fi or NFC. When a mobile phone wirelessly communicates with the battery pack for the first time, the mobile phone is one-to-one bound to the battery pack, and data of the battery pack is transmitted to the mobile phone by wireless transmission. Data can be directly transmitted when the mobile phone wirelessly communicates with the battery pack a next time. When the user changes the mobile phone, the mobile phone needs to be unbound from the battery pack. After being unbound, a new mobile phone is bound to the battery pack for data transmission.

Specifically, in an embodiment of the present invention, Bluetooth transmission is used as an example. The mobile phone sends a connection signal to a second Bluetooth module of the battery pack through a first Bluetooth module in the mobile phone. The second Bluetooth module transmits the connection signal to a battery pack control module to establish a connection between the mobile phone and the battery pack control module. The mobile phone controls the battery pack control module with an administrator's permission to implement functions such as activation or locking of the battery pack, management of use data of the battery pack, reminding of maintenance of the battery pack, locating of the battery pack, and anti-theft monitoring.

When another mobile phone needs to be added to control the battery pack, the another mobile phone sends a connection signal to the second Bluetooth module. The second Bluetooth module transmits the connection signal to the battery pack control module. The battery pack control module sends a feedback signal to an original master mobile phone through wireless communication between the first Bluetooth module and the second Bluetooth module, and an operator of the original master mobile phone performs determination and makes a reply. A reply signal of the master mobile phone is transmitted to the battery pack control module through the first Bluetooth module and the second Bluetooth module. The battery pack control module performs determination according to the received reply signal. If the master mobile phone replies with an administrator, the another mobile phone is added to a controller range and granted the administrator's permission. If the master mobile phone replies with general management or common management, the another mobile phone is granted a common management right. If the master mobile phone replies with no, the another mobile phone is rejected from admission to the controller range.

In the present embodiment, the mobile terminal wirelessly communicates with the battery pack control module, and the mobile terminal controls the battery pack control module to implement functions such as activation or locking of the battery pack, management of use data of the battery pack, reminding of maintenance of the battery pack, locating of the battery pack, and anti-theft monitoring. In case of wireless communication between the battery pack and the mobile terminal, the mobile terminal may transmit a lock signal by wireless transmission. After the battery pack control module receives the lock signal transmitted by the mobile terminal, the control module controls the battery pack not to output electric energy, that is, lock the battery pack, thereby preventing misoperation of a child and ensuring the use safety of the battery pack. When the user needs to unlock the battery pack, the mobile terminal transmits an activation signal to the battery pack by wireless transmission. After the battery pack control module receives the activation signal, the control module controls the battery pack to operate live to implement the activation of the battery pack.

It should be noted that configuration information sent by the mobile terminal may also be information for configuring an electric tool electrically connected to the battery pack, for example, configuration information for indicating locking or unlocking of the electric tool. Correspondingly, after the battery pack acquires electric tool lock information sent by the mobile terminal, the electric tool lock information may be sent to the electric tool, so that the electric tool is locked to prevent misoperation of a child and ensure the use safety of the electric tool.

In addition, the mobile terminal may further perform parameter configuration and software upgrade of the battery pack. That is, after the battery pack wirelessly communicates with the mobile terminal, the method further includes:

sending, by the mobile terminal, configuration information of the battery pack to the battery pack by wireless transmission; and performing, by the battery pack software upgrade of the battery pack or parameter replacement of the battery pack according to the received configuration information.

The configuration information may be configuration information for indicating software upgrade of the battery pack, a control parameter of the battery pack, or configuration information for controlling locking or unlocking of the battery pack, which is not limited herein.

It should be noted that the battery pack may be lost during application of the battery pack. With respect to the foregoing similar case, in the embodiment of the present invention, a safe distance between the battery pack and the mobile terminal may be set as required. When a distance between the battery pack and the mobile terminal is greater than the safe distance, the user is reminded through the mobile terminal. Specifically, the user may be reminded in any manner such as popping up an alarm message or broadcasting a voice message, which is not limited herein.

Further, to enable the user to determine the location of the battery pack or the electric tool when the battery pack or the electric tool is lost, when a distance between the battery pack and the mobile terminal is greater than a preset safe distance between the battery pack and the mobile terminal, the mobile terminal outputs a prompt message. In this case, if wireless communication still exists between the battery pack and the mobile terminal, the battery pack may send current location information of the battery pack to the mobile terminal to help the user to find the battery pack.

In the embodiment of the present invention, when the mobile terminal disconnects wireless communication such as Wi-Fi, Bluetooth or NFC from the battery pack, the battery pack records an ID of the battery pack and a time of disconnecting the wireless communication. The method for displaying information of a battery pack according to the embodiment of the present invention may further include:

when it is determined that wireless communication is disconnected from the battery pack, recording an ID and a current location of the battery pack and time information. Specifically, reliable clues and reference can be provided for the user to find the battery pack by recording information such as a time or a current location when the battery pack is connected to the terminal last time and transmitting the recorded ID, location, and time information to the mobile terminal through mobile GSM in combination with third-party map software such as Baidu Maps or AutoNavi Maps. In the method for displaying information of a battery pack based on a mobile terminal according to the embodiment of the present invention, after the battery pack establishes wireless communication with the mobile terminal, the battery pack may acquire attribute information of an electric tool electrically connected to the battery pack, and then send the attribute information of the electric tool to the mobile terminal. The mobile terminal displays the attribute information of the electric tool.

Further, the mobile terminal may control the electric tool. That is, a control parameter such as speed and torque of the electric tool may be set through the mobile terminal. The electric tool control parameter is sent to the electric tool electrically connected to the battery pack, so that the electric tool is controlled to operate according to the set parameter. In this way, the control of the electric tool by the mobile terminal is implemented through the battery pack.

It should be noted that to improve user experience and enable the method for displaying information of a battery pack to be more intelligent, the method for displaying information of a battery pack based on a mobile terminal in the present invention further includes:

acquiring, by the mobile terminal, use data of the battery pack or the electric tool connected to the battery pack, and providing a user with a use recommendation according to the use data; and displaying the use recommendation on the mobile terminal. Alternatively, the method further includes: acquiring, by the mobile terminal, model or parameter information of the battery pack or the electric tool connected to the battery pack, and acquiring a purchase step of an accessory of the battery pack or the electric tool according to the model or parameter information; and displaying the purchase step on the mobile terminal.

In the foregoing embodiment, the mobile terminal may directly acquire use data or model or parameter information of the battery pack or the electric tool and analyze the use data, so as to provide the user with use and purchase recommendations. The mobile terminal may also transmit the acquired use data and model or parameter information of the battery pack or the electric tool to a cloud server, and the cloud server performs big data analysis on the received use data and model or parameter information to provide the user with use or purchase recommendations.

The battery pack, the electric tool connected to the battery pack, and the mobile terminal may form an Internet of Things (TOT) for information exchange, communication, and big data analysis, thereby implementing functions such as monitoring and management of the electric tool by the mobile terminal (for example, APP software is installed on the mobile terminal, and a use recommendation of the battery pack or an operating method recommendation of the electric tool is displayed on the mobile terminal), locating and tracking of the battery pack by the mobile terminal, and purchase of accessories and consumables.

Specifically, a purchase guide for accessories required by the battery pack and the electric tool is displayed on the mobile terminal. Use data of different battery packs and electric tools is collected for big data analysis via the IOT. For example, after the battery pack, the electric tool, and the mobile terminal are connected to the IOT, a battery pack supplier may determine, according to an access address of the battery pack, the electric tool or the mobile terminal, a region to which the battery pack, the electric tool or the mobile terminal belongs. Next, big data statistics and analysis may be performed on attribute information of battery packs and attribute information of electric tools in a region, and use characteristics of the battery packs and operation characteristics of the electric tools in the region are determined according to analysis results, so as to adjust supply of battery packs in the region.

For example, if it is determined that the battery packs are generally used in electric tools with relatively low rated power in the region, the supply of the battery packs in the region may be adjusted to: increasing supply of battery packs with relatively low rated power and reducing supply of battery packs with relatively high rated power, so as to better meet market demands.

Alternatively, after the battery pack, the electric tool, and the mobile terminal are connected to the IOT, a battery pack supplier may monitor a location and a use state of each battery pack and provide a purchase guide for a user according to the usage of the battery pack, thereby improving user experience and intelligence level.

For example, if a rated quantity of times of charge or discharge of the battery pack is 800, when it is detected that a quantity of times of charge or discharge of a battery is close to the rated quantity of times, the location of a supplier closer to the location of the battery pack in suppliers supplying the type of battery packs may be determined according to the type and location of the battery pack, so that a recommendation message may be sent to a mobile terminal that wirelessly communicates with the battery pack. The recommendation message may include a performance parameter of the battery pack, the location of the supplier, and the like to prompt the user that the battery pack needs to be replaced in time and the user may go to the supplier to purchase a new battery pack for replacement, so that the user can rapidly purchase a new battery pack according to the recommendation message. The usage of the battery pack is monitored and a purchase guide is provided for a user, so that user requirements can be better satisfied and user experience can be improved.

Figure 4:
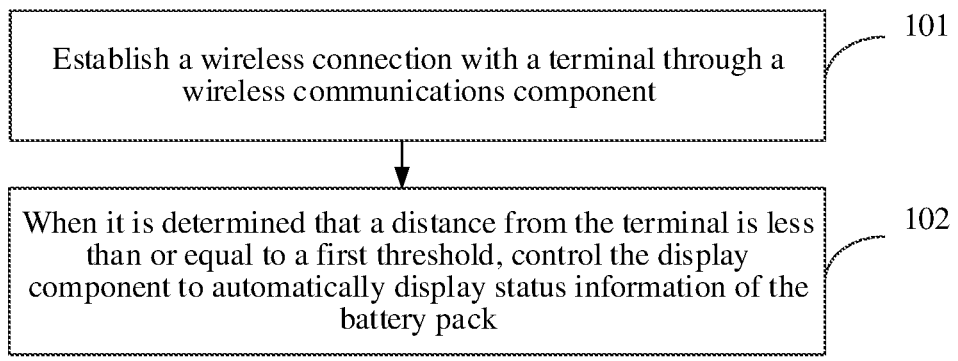
FIG. 4 is a schematic flowchart of a method for displaying information of a battery pack according to a fourth embodiment of the present invention.

FIG. 4 is a schematic flowchart of a method for displaying information of a battery pack according to a fourth embodiment of the present invention.

As shown in FIG. 4, the method for displaying information of a battery pack is applied to a battery pack having a display component and a wireless communications component. The method includes the following steps.

Step 101: Establish wireless communication with a terminal through a wireless communications component.

Specifically, the method for displaying information of a battery pack according to the embodiment of the present invention may be performed by a controller in the battery pack according to the embodiment of the present invention, so as to control the display component to display status information of the battery pack.

The display component may be any component that can display information, for example, a light-emitting diode (LED), an LED nixie tube or a liquid crystal display (LCD).

The wireless communications component may be any component that can implement wireless communication such as a Bluetooth component, a Wi-Fi component, a Sub-1-GHz, for example, 433-MHz or 868-MHz band component, or a wireless local area network (WLAN) Authentication and Privacy Infrastructure (WAPI) component.

Besides, the terminal may be any terminal device that can establish wireless communication with the battery pack, for example, a mobile phone, a computer or a wearable device.

During specific implementation, the terminal may continuously send wireless signals to the outside, and the battery pack may establish wireless communication with the wireless communications component when acquiring the wireless signal sent by the terminal; or the battery pack may continuously send wireless signals to the outside, and the terminal may establish wireless communication with the battery pack when acquiring the wireless signal sent by the battery pack. This is not limited in this embodiment.

It may be understood that to ensure information security, the battery pack may also verify whether the terminal is valid before establishing a wireless network connection with the terminal. That is, before step 101, the method may further include:

determining that the terminal is any terminal in a matching terminal list; or determining that a connection password sent by the terminal is valid.

The matching terminal list includes all terminals that have established connections with the battery pack.

Specifically, it may be determined according to a terminal ID whether a current terminal is any terminal in the matching terminal list, or it may be determined according to an ID of the wireless communications component of the terminal whether the terminal is valid, which is not limited herein. The terminal ID may be a terminal factory model or user-defined character, or the like, which is not limited herein.

During specific implementation, if the battery pack determines that the terminal is any terminal in the matching terminal list after acquiring the wireless signal sent by the terminal, that is, the battery back has established wireless communication with the terminal, wireless communication may be directly established with the terminal through the wireless communications component.

Further, if the battery pack determines that the terminal is not any terminal in the matching terminal list after receiving the wireless signal sent by the terminal, that is, the battery back has never established wireless communication with the terminal, a message of inputting a connection password may be sent to the terminal. After the connection password sent by the terminal is received, a connection may be established with the terminal through the wireless communications component if the connection password is determined to be valid.

Alternatively, the terminal may also send a connection password to the battery pack when establishing a connection with the battery pack for the first time, and the battery pack may establish a connection with the terminal through the wireless communications component if determining that the connection password is valid.

The connection password may be set when the battery pack is delivered from the factory or set by a user, which is not limited in this embodiment.

It should be noted that after the terminal establishes a connection with the battery pack for the first time, the battery pack may save the ID of the terminal or the ID of the wireless communications component of the terminal into the matching terminal list, so that the battery pack can automatically establish a connection with the terminal after receiving again the wireless signal sent by the terminal since the terminal is a terminal in the matching terminal list.

The foregoing example of determining whether the terminal is valid is merely a schematic description, and cannot be understood as a limitation to the technical solution of the present application. On this basis, a person skilled in the art can arbitrarily set, as required, a method for determining whether the terminal is valid, which is not limited herein.

Step 102: Control the display component to automatically display status information of the battery pack when it is determined that a distance from the terminal is less than or equal to a first threshold.

The first threshold may be set as required. Specifically, since the status information displayed in the battery pack is intended to enable the user to know the status of the battery pack, the first threshold in this embodiment may be set according to factors such as a visual distance of a human eye and a font size displayed on the display component. For example, when the user is within 10 meters (m) from the battery pack, the status information displayed on the display component can be clearly seen, so that the first threshold may be set to 10 m.

In addition, the battery pack may determine the distance from the terminal according to a received wireless signal strength sent by the terminal.

It may be understood that the strength of a wireless signal sent by a signal source gradually attenuates as a distance increases. Therefore, in the embodiment of the present invention, a distance between the battery pack and the terminal may be determined according to a wireless signal strength sent by the terminal that is received by the battery pack, and it is then determined whether the distance between the battery pack and the terminal is less than or equal to the first threshold.

Specifically, the distance may be calculated according to a Received Signal Strength Indication (RSSI) by using the following formula:

$$d = 10^{\frac{|RSSI|-A}{10*n}}$$

where d is the distance between the battery pack and the terminal, A is a preset signal strength when the battery is 1 m from the terminal, and n is a preset environmental attenuation factor.

It may be understood that since wireless signal strengths of different terminals may be different and environmental attenuation factors in different working environments are also different, the distance between the battery pack and the terminal calculated by using the foregoing formula in this embodiment is an approximate value.

Alternatively, in the embodiment of the present invention, a signal strength threshold corresponding to the first threshold may also be preset, and it is set that the battery pack only receives a wireless signal whose strength is greater than the preset strength threshold, so that it may be determined that the distance between the battery pack and the terminal is less than or equal to the first threshold when the battery pack receives a wireless signal sent by the terminal.

Alternatively, since the wireless signal is transmitted at a fixed speed, in the embodiment of the present invention, the distance between the battery pack and the terminal may also be determined according to a Time of Flight (TOF) of the wireless signal.

Specifically, it may be set that the battery pack sends a wireless signal to the terminal and then the terminal returns the wireless signal, so that the distance between the battery pack and the terminal is determined by using the following formula according to a moment at which the battery pack sends the wireless signal and a moment at which the battery pack receives the wireless signal returned by the terminal.

$$d = \frac{t_2 - t_1}{2} * s$$

where d is the distance between the battery pack and the terminal, $t_2$ is the moment at which the battery pack receives the wireless signal returned by the terminal, $t_1$ is the moment at which the battery pack sends the wireless signal, and s is a transmission speed of the wireless signal.

Specifically, after the battery pack establishes wireless communication with the terminal, the display component may be controlled to automatically display status information of the battery pack if it is determined that the distance between the battery pack and the terminal is less than or equal to the first threshold.

The status information may include at least one of information related to the battery pack such as a remaining charge level, a temperature, a capacity, a quantity of times of charge or discharge, a cumulative operating time, and the remaining life of the battery pack.

During specific implementation, the status information of the battery pack may be displayed by controlling the display quantity of LED lamps, a flashing frequency of the LED lamps, displayed figures of the LED nixie tube, or specific text information or image information displayed on the LCD, and the like. For example, when the display component includes three LED lamps, all the three LED lamps may be controlled to be turned on, indicating a sufficient charge level. When two LED lamps are controlled to be turned on, a medium charge level is indicated. When one LED lamp is controlled to be turned on, a low charge level is indicated.

It may be understood that if the battery pack is in a charge or discharge state, the user may need to learn the status information of the battery pack in real time, so as to respond in time when the charge level of the battery pack is insufficient. When the battery pack is in a still state, the user may not need to pay close attention to the status information of the battery pack. Therefore, in the embodiment of the present invention, it may also be set that when the battery pack is in different operating states, the display component displays the status information of the battery pack in different display modes.

That is, before step 102 of controlling the display component to automatically display status information of the battery pack, the method further includes:

determining a current operating state of the battery pack; and determining a target display mode of the display component according to the current operating state.

Correspondingly, step 102 of controlling the display component to automatically display status information of the battery pack may include:

controlling, according to the target display mode, the display component to automatically display the status information of the battery pack.

The operating state may include discharge, charge, and still states.

The display mode may be determined according to the type of the display component. For example, when the display component is an LED lamp, the display mode may include a display quantity, a display color, a display frequency, display duration, and the like. When the display component is an LED nixie tube, the display mode may include a display figure, a display frequency, display duration, and the like. When the display component is an LCD, the display mode may include a display frequency, display duration, display content, a font size, and the like.

Specifically, it may be preset that different operating states of the battery pack correspond to different display modes, so that after a current operating state of the battery pack is determined, a target display mode of the display component may be determined according to the current operating state, and the display component is controlled according to the target display mode to automatically display status information of the battery pack.

For example, it is preset that when the battery pack is in the discharge state, the display mode is that the display component displays the status information of the battery pack in real time. When the battery pack is in the still state, the display mode is that the display component displays the status information of the battery pack at a time interval of 5 s, and each display time is 1 s. Next, when the current operating state of the battery pack is determined as the discharge state, the display component may be controlled to display the status information of the battery pack in real time.

Alternatively, it is preset that when the battery pack is in the discharge state, the display mode is that the display component displays a charge level, a cumulative operating time, and the temperature of the battery pack. When the battery pack is in the still state, the display mode is that the display component displays a charge level, a quantity of times of charge or discharge, and the remaining life of the battery pack. Next, when the current operating state of the battery pack is determined as the discharge state, the display component may be controlled to display the charge level, the cumulative operating time, and the temperature of the battery pack.

In this embodiment, the display component is controlled to automatically display status information of the battery pack according to a current operating state of the battery pack in a corresponding target display mode, which minimizes still power consumption of the battery pack while ensuring that the user can acquire the status information of the battery pack, thereby improving user experience.

It may be understood that when the distance between the battery pack and the terminal is excessively large, the user may be unable to see the status information displayed on the display component. In this case, the display component can be turned off to save the charge level of the battery pack. However, when the distance between the terminal and the battery pack is slightly greater than the first threshold, if the display component is turned off, the display component may fail to be turned on in time when the distance between the terminal and the battery pack is less than or equal to the first threshold. In consideration of this, to enable the user to learn the status information of the battery pack in time when the distance between the terminal and the battery pack is less than or equal to the first threshold and to prevent the display component from being frequently turned on or turned off when the distance between the terminal and the battery pack is less than or equal to the first threshold affects the service life of the display component, in the embodiment of the present invention, it may be set that the display component is not directly turned off when the distance between the battery pack and the terminal is slightly greater than the first threshold.

That is, in the embodiment of the present invention, the method may further include:

if the distance from the terminal is greater than the first threshold, controlling the display component to display the status information of the battery pack at intervals at a preset frequency.

The preset frequency may be set as required. For example, the preset frequency may be set according to factors such as the charge level and the operating state of the battery pack.

Alternatively, if the distance from the terminal is greater than the first threshold, the display component is controlled to sleep, and when it is determined that the status information of the battery pack is updated or a wake-up broadcast is received, the display component is woken up to automatically display the updated status information of the battery pack.

Specifically, if the distance between the battery pack and the terminal is greater than the first threshold, the display component is controlled to enter a sleep mode. When it is determined that the status information such as the charge level or the temperature of the battery pack changes, the display component is woken up, and the display component is controlled to automatically display the updated status information of the battery pack.

Besides, the display component is turned off when it is determined that the distance from the terminal is greater than a second threshold.

The second threshold is greater than the first threshold.

Figure 4A:
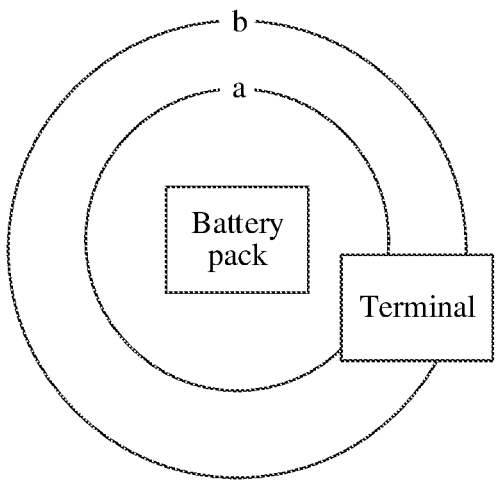
FIG. 4A is an example diagram of the method for displaying information of a battery pack according to the fourth embodiment of the present invention.

For example, it is assumed that as shown in FIG. 4A, the first threshold is a, and the second threshold is b. It may be set that when the distance between the battery pack and the terminal is less than a, the display component is controlled to display the status information of the battery pack in real time. When the distance between the battery pack and the terminal is greater than a and less than b, the display component is controlled to display the status information of the battery pack at intervals at a frequency of 5 s. When the distance between the battery pack and the terminal is greater than b, the display component is turned off. In this case, a controller of the battery pack may operate in a cyclic low power mode of sleep, wake-up broadcast, and sleep. After the wake-up broadcast is acquired, the display component is controlled to be turned on to display the status information of the battery pack.

In a possible implementation form, after the battery pack establishes wireless communication with the terminal, the battery pack may also control the display component to display the status information of the battery pack when acquiring an on-status information display instruction sent by the terminal. That is, before the controlling the display component to automatically display status information of the battery pack, the method may further include:

determining that an on-status information display instruction sent by the terminal is acquired.

It should be noted that in the embodiment of the present invention, after the battery pack establishes wireless communication with the terminal, the display component may be controlled according to a distance from the terminal to automatically display status information of the battery pack. Alternatively, in a possible implementation form of the present invention, after the battery pack establishes wireless communication with the terminal, the display component is controlled to automatically display the status information of the battery pack only after an on-status information display instruction sent by the terminal is received. Alternatively, in a possible implementation form of the present invention, when the battery pack receives an on-status information display instruction sent by the terminal and a distance between the battery pack and the terminal is less than or equal to a first threshold, the display component is controlled to automatically display status information of the battery pack.

Correspondingly, the battery pack may control the display component to automatically display status information of the battery pack after receiving an on-status information display instruction sent by the terminal, and control the display component to be turned off and stop displaying the status information of the battery pack after receiving an off-status information display instruction sent by the terminal.

For example, if a condition for displaying the status information of the battery pack is that an on-status information display instruction sent by the terminal is received and a distance from the terminal is less than or equal to a first threshold, it may be determined that the display component cannot be turned on if an off-status information display instruction sent by the terminal is received when the distance between the terminal and the battery pack is less than or equal to the first threshold.

It should be noted that to help the user to learn the status information of the battery pack, in the embodiment of the present invention, the battery pack may also send the status information of the battery pack to the terminal, so as to display the status information of the battery pack on the terminal. That is, after step 101, the method may further include:

sending the status information of the battery pack to the terminal through the wireless communications component.

Besides, to improve flexibility of display of the status information of the battery pack, in the embodiment of the present invention, a control button may further be mounted on the battery pack, so that the user can use the control button to control the display component to display the status information of the battery pack.

That is, the method for displaying information of a battery pack according to the embodiment of the present invention may further include:

when it is determined that the control button is triggered, controlling the display component to display the status information of the battery pack.

Specifically, when the display component is turned off, if it is determined that the control button is triggered, the display component may be controlled to display the status information of the battery pack. When the display component displays the status information of the battery pack, if it is determined that the control button is triggered, the display component may be controlled to be turned off.

In the method for displaying information of a battery pack according to the embodiment of the present invention, the battery pack may establish wireless communication with a terminal through a wireless communications component, so that the battery pack may control a display component to automatically display status information of the battery pack when determining that a distance from the terminal is less than or equal to a first threshold. In this way, the status information of the battery pack may be displayed only if the terminal carried by the user approaches the battery pack. The operation manner is simple, convenient, and easy to implement, and user experience is improved.

It can be known from the foregoing analysis that after establishing wireless communication with the terminal, the battery pack may control the display component to automatically display status information of the battery pack when determining that a distance from the terminal is less than or equal to a first threshold. In a possible implementation form, after establishing wireless communication with the terminal, the battery pack may also use the terminal to control an electric tool electrically connected to the battery pack. The foregoing case is described below in detail with reference to FIG. 5.

Figure 5:
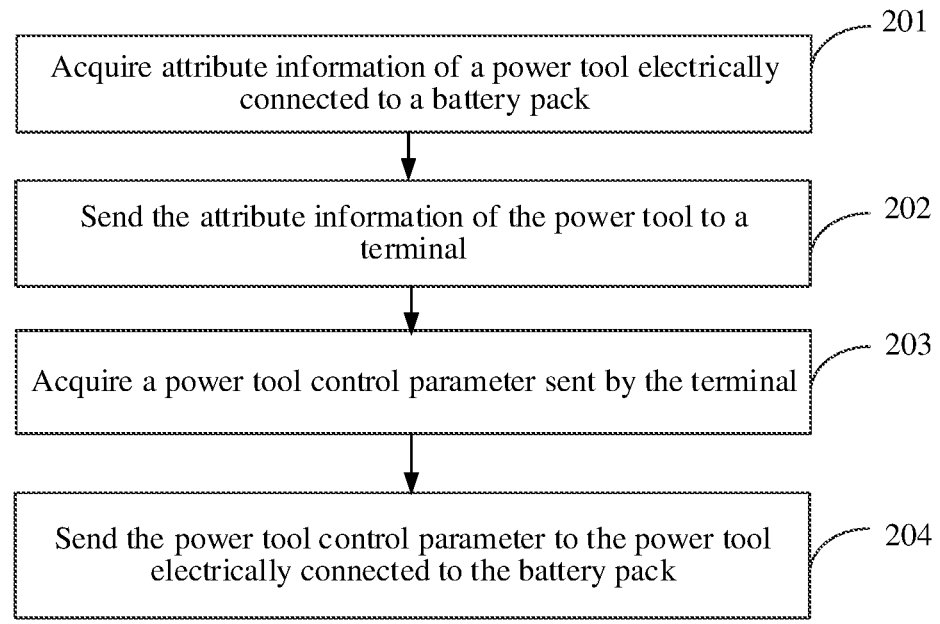
FIG. 5 is a schematic flowchart of a method for displaying information of a battery pack according to a fifth embodiment of the present invention.

FIG. 5 is a schematic flowchart of a method for displaying information of a battery pack according to a fifth embodiment of the present invention.

As shown in FIG. 5, the method for displaying information of a battery pack may further include the following steps.

Step 201: Acquire attribute information of an electric tool electrically connected to a battery pack.

The electric tool may be any tool such as a chain saw, a lawn mower, a snow remover or an electric drill that can be powered by a battery pack.

The attribute information may include information such as a type, a rated voltage, a rated current, a rated power, a motor speed, torque information, and an operating characteristic curve of the electric tool.

Step 202: Send the attribute information of the electric tool to the terminal.

Specifically, after acquiring the attribute information of the electric tool electrically connected to the battery pack, the battery pack may send the attribute information of the electric tool to the terminal through the wireless communications component.

Step 203: Acquire an electric tool control parameter sent by the terminal.

The control parameter may include parameters such as a motor speed and a torque.

Step 204: Send the electric tool control parameter to the electric tool electrically connected to the battery pack.

Specifically, after acquiring the attribute information of the electric tool sent by the battery pack, the terminal may set an electric tool control parameter according to the attribute information and send the control parameter to the battery pack by wireless communication, so that the battery pack may send the acquired control parameter to the electric tool electrically connected to the battery pack to implement control of the electric tool by the terminal.

Besides, the terminal may further configure the battery pack, that is, after the battery pack establishes wireless communication with the terminal through the wireless communications component, the method may further include:

acquiring configuration information sent by the terminal; and configuring the battery pack according to the configuration information.

The configuration information may be information for configuring the battery pack, for example, configuration information for indicating software upgrade of the battery pack, or configuration information for indicating locking or unlocking of the battery pack or other configuration information, which is not limited herein.

Specifically, the terminal may determine the configuration information according to the status information of the battery pack or the attribute information of the electric tool electrically connected to the battery pack, and send the configuration information to the battery pack, so that the battery pack can configure the battery pack according to the configuration information sent by the terminal.

For example, assuming that the battery pack acquires configuration information indicating software upgrade of the battery pack sent by the terminal, the battery pack may perform software upgrade according to the configuration information. Assuming that the battery pack acquires information indicating locking of the battery pack, the battery pack may be locked to prevent misoperation of a child and ensure the use safety of the battery pack.

It should be noted that the configuration information sent by the terminal may also be information for configuring the electric tool electrically connected to the battery pack, for example, configuration information for indicating locking or unlocking of the electric tool. Correspondingly, after acquiring the information indicating locking of the electric tool sent by the terminal, the battery pack may send the information indicating locking of the electric tool to the electric tool, so that the electric tool is locked to prevent misoperation of a child and ensure the use safety of the electric tool.

In the method for displaying information of a battery pack according to the embodiment of the present invention, after the battery pack establishes wireless communication with the terminal, the battery pack may acquire attribute information of an electric tool electrically connected to the battery pack and then send the attribute information of the electric tool to the terminal, and after acquiring an electric tool control parameter sent by the terminal, send the electric tool control parameter to the electric tool electrically connected to the battery pack. In this way, the control of the electric tool by the terminal is implemented through the battery pack.

The method for displaying information of a battery pack according to the embodiment of the present invention is described below in detail by taking a side of a terminal as an example.

Figure 6:
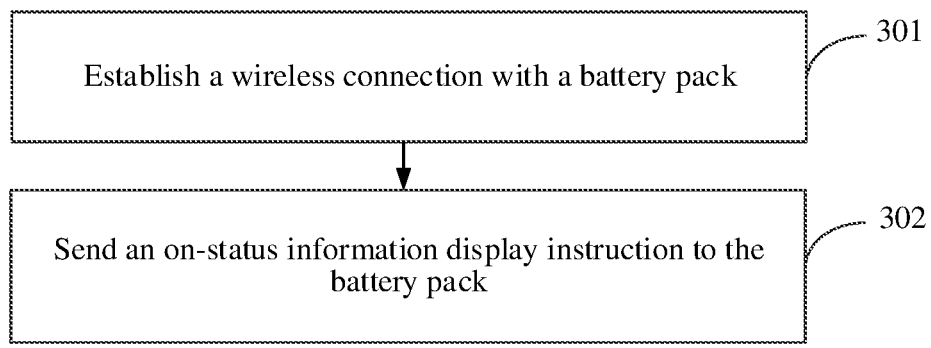
FIG. 6 is a schematic flowchart of a method for displaying information of a battery pack according to a sixth embodiment of the present invention.

FIG. 6 is a schematic flowchart of a method for displaying information of a battery pack according to a sixth embodiment of the present invention.

As shown in FIG. 6, the method for displaying information of a battery pack is applied to a terminal, and includes the following steps.

Step 301: Establish wireless communication with a battery pack.

The method for displaying information of a battery pack according to the embodiment of the present invention is applied to any terminal having a wireless communication function, for example, a mobile phone, a computer or a wearable device.

Specifically, the terminal may include any wireless communications component that can implement wireless communication such as a Bluetooth component, a Wi-Fi component, a Sub1-GHz band component or a WAPI component, so as to establish wireless communication with the battery back through the wireless communications component.

Step 302: Send an on-status information display instruction to the battery pack.

Specifically, after the terminal establishes wireless communication with the battery back, the terminal may send an on-status information display instruction to the battery pack, so that the battery pack controls a display component to automatically display status information of the battery pack. Besides, the terminal may further send an off-status information display instruction to the battery pack, so that the battery pack controls a display component to stop displaying the status information of the battery pack.

In addition, after establishing wireless communication with the terminal, the battery pack may further send status information of the battery pack to the terminal, so that the terminal can display or broadcast the status information of the battery pack after receiving the status information returned by the battery pack. That is, after step 302, the method may further include: receiving status information returned by the battery pack; and displaying or broadcasting the status information of the battery pack.

In a possible implementation form, after the terminal establishes wireless communication with the battery back, the terminal may use the battery pack to control an electric tool electrically connected to the battery pack. That is, after step 301, the method may further include:

acquiring attribute information of an electric tool sent by the battery pack, where the electric tool is electrically connected to the battery pack; and sending an electric tool control parameter to the battery pack according to the attribute information of the electric tool, so that the battery pack sends the control parameter to the electric tool.

The electric tool may be any tool such as a chain saw, a lawn mower, a snow remover or an electric drill that can be powered by a battery pack.

The attribute information may include information such as a type, a rated voltage, a rated current, a rated power, a motor speed, torque information, and an operating characteristic curve of the electric tool.

The control parameter may include parameters such as a motor speed and a torque.

Specifically, after acquiring the attribute information of the electric tool electrically connected to the battery pack, the battery pack may send the attribute information of the electric tool to the terminal through the wireless communications component, and after acquiring the attribute information of the electric tool, the terminal may set an electric tool control parameter according to the attribute information of the electric tool and send the control parameter to the battery pack by wireless communication, so that the battery pack can send the control parameter to the electric tool to implement control of the electric tool by the terminal.

Besides, the terminal may further configure the battery pack or the electric tool according to the status information of the battery pack or the attribute information of the electric tool. That is, in the embodiment of the present invention, the method may further include:

determining configuration information according to the status information of the battery pack or the attribute information of the electric tool; and sending the configuration information to the battery pack.

The configuration information may be information for configuring the battery pack or the electric tool. For example, the configuration information may be configuration information for indicating software upgrade of the battery pack, or configuration information for indicating locking or unlocking of the electric tool or other configuration information, which is not limited herein.

Specifically, after determining the configuration information according to the status information of the battery pack or the attribute information of the electric tool, the terminal may send the configuration information to the battery pack. If the configuration information is information for configuring the battery pack, the battery pack may configure the battery pack according to the configuration information. For example, when the configuration information is configuration information for indicating software upgrade of the battery pack, the battery pack may perform software upgrade according to the configuration information after acquiring the configuration information. If the configuration information is information for configuring the electric tool, the battery pack may further send the configuration information to the electric tool to implement configuration of the electric tool. For example, when the configuration information is configuration information for indicating locking of the electric tool, the battery pack may send the configuration information to the electric tool, so that the electric tool is locked to prevent misoperation of a child and ensure the use safety of the electric tool.

It should be noted that the battery pack may be lost during application of the battery pack. With respect to the foregoing similar case, in the embodiment of the present invention, a safe distance between the battery pack and the terminal can be set as required, and when a distance between the battery pack and the terminal is greater than the safe distance, the user is reminded through the terminal. Specifically, the user may be reminded in any manner such as popping up an alarm message or broadcasting a voice message, which is not limited herein.

Further, to enable the user to determine the location of the battery pack or the electric tool when the battery pack or the electric tool is lost, in the embodiment of the present invention, it may also be set that when disconnected from the battery pack, the terminal records an ID of the battery pack and a time when the terminal is disconnected from the battery pack, and record, in combination with third-party map software such as Baidu Maps or AutoNavi Maps, information such as the location of the battery pack when the battery pack is disconnected from the terminal.

That is, the method for displaying information of a battery pack according to the embodiment of the present invention may further include:

when it is determined that wireless communication is disconnected from the battery pack, recording an ID and a current location of the battery pack and time information.

Specifically, reliable clues and reference can be provided for the user to find the battery pack by recording information such as a location and a time when the battery pack is connected to the terminal for the last time.

It should be noted that in the embodiment of the present invention, the battery pack, the electric tool where the battery pack is located, and the terminal may form an IoT for information exchange, communication, and big data analysis, thereby implementing functions such as monitoring and management of the electric tool by the terminal (for example, APP software is installed on the terminal, and an optimal operating method recommendation is provided), locating and tracking of the battery pack by the mobile terminal, and purchase of accessories and consumables.

It should be noted that in the embodiment of the present invention, the battery pack, the electric tool electrically connected to the battery pack, and the terminal may form an IoT to perform information exchange, communication, and big data analysis, and the user is provided with an optimal battery pack use recommendation, an operating method recommendation for the electric tool, a purchase guide for accessories and consumables, and the like.

For example, after the battery pack, the electric tool, and the terminal are connected to the IoT, a battery pack supplier may determine, according to an access address of the battery pack, the electric tool or the terminal, a region to which the battery pack, the electric tool or the terminal belongs. Next, big data statistics and analysis may be performed on attribute information of battery packs and attribute information of electric tools in a region, and use characteristics of the battery packs and operation characteristics of the electric tools in the region are determined according to analysis results, so as to adjust supply of battery packs in the region.

For example, if it is determined that the battery packs are generally used in electric tools with relatively low rated power in the region, the supply of the battery packs in the region may be adjusted to: increasing supply of battery packs with relatively low rated power and reducing supply of battery packs with relatively high rated power, so as to better meet market demands.

Alternatively, after the battery pack, the electric tool, and the terminal are connected to the IoT, a battery pack supplier may monitor a location and a use state of each battery pack and provide a purchase guide for a user according to the usage of the battery pack.

For example, if a rated quantity of times of charge or discharge of the battery pack is 800, when it is detected that a quantity of times of charge or discharge of a battery is close to the rated quantity of times, the location of a supplier closer to the location of the battery pack in suppliers supplying the type of battery packs may be determined according to the type and location of the battery pack, so that a recommendation message may be sent to a terminal that wirelessly communicates with the battery pack. The recommendation message may include a performance parameter of the battery pack, the location of the supplier, and the like to prompt the user that the battery pack needs to be replaced in time and the user may go to the supplier to purchase a new battery pack for replacement, so that the user can rapidly purchase a new battery pack according to the recommendation message. The usage of the battery pack is monitored and a purchase guide is provided for a user, so that user requirements can be better satisfied and user experience can be improved.

In the method for displaying information of a battery pack according to the embodiment of the present invention, after establishing wireless communication with the battery pack, the terminal may control the battery pack to display status information by sending an on-status information display instruction to the battery pack. In this way, the status information of the battery pack can be displayed only by sending an on-status information display instruction to the battery pack through the terminal. The operation manner is simple, convenient, and easy to implement, and user experience is improved.

Figure 7:
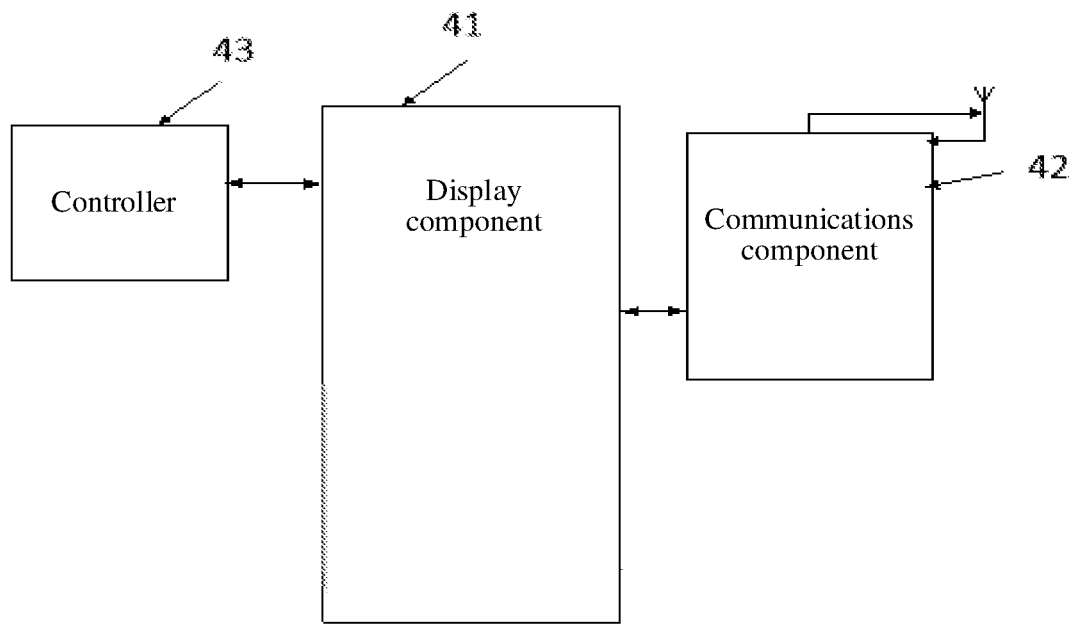
FIG. 7 is a schematic structural diagram of a battery pack according to a seventh embodiment of the present invention.

FIG. 7 is a schematic structural diagram of a battery pack according to a seventh embodiment of the present invention.

As shown in FIG. 7, the battery pack includes a display component 41, a wireless communications component 42, and a controller 43.

The display component 41 is configured to display status information of the battery pack.

The wireless communications component 42 is configured to cause the battery pack to wirelessly communicate with a terminal.

The controller 43 is configured to perform the method for displaying information of a battery pack as described in the foregoing embodiment on the side of the battery pack.

Specifically, the display component 41 is any one of the following: an LED, an LED nixie tube or an LCD.

The wireless communications component 42 is any one of the following: a Bluetooth component, a Wi-Fi component, a Sub-1-GHz band component or a WAPI component.

It should be noted that the foregoing explanation to the embodiment of the method for displaying information of a battery pack performed on the side of the battery pack is also applicable to the battery pack of this embodiment, which is not described in detail herein.

The battery pack according to the embodiment of the present invention can establish wireless communication with the terminal through the wireless communications component, so that the controller may control the display component to automatically display status information of the battery pack when determining that a distance from the terminal is less than or equal to a first threshold. In this way, the status information of the battery pack can be displayed only if the terminal carried by the user approaches the battery pack. The operation manner is simple, convenient, and easy to implement, and user experience is improved.

Figure 8:
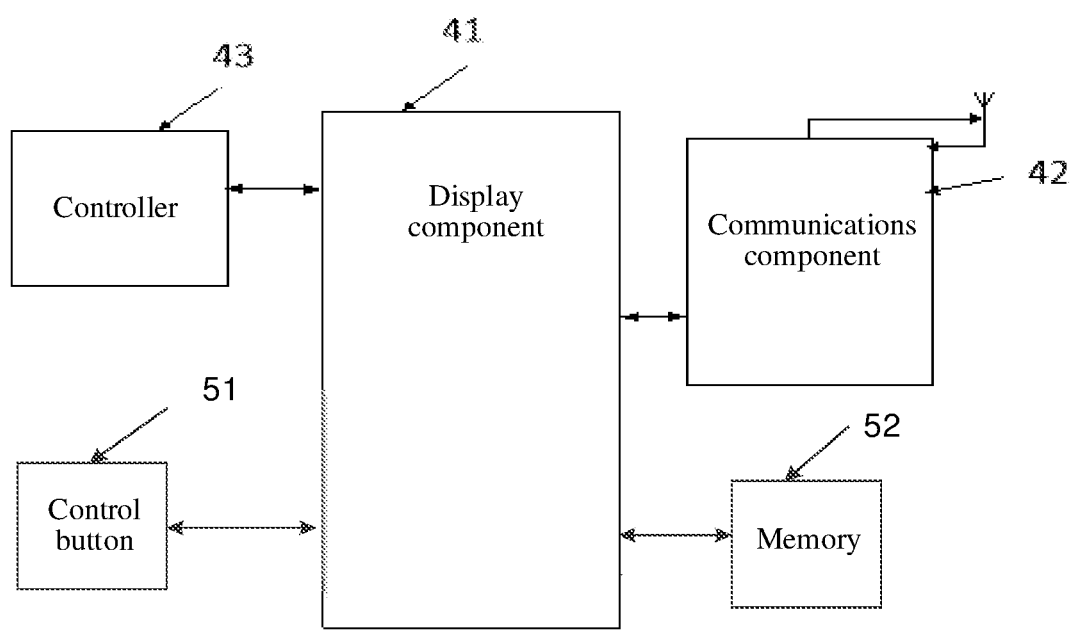
FIG. 8 is a schematic structural diagram of a battery pack according to an eighth embodiment of the present invention.

FIG. 8 is a schematic structural diagram of a battery pack according to an eighth embodiment of the present invention.

As shown in FIG. 8, based on FIG. 7, the battery pack may further include:

a control button 51, configured to receive a user trigger to display status information of the battery pack;

a memory 52, configured to store the status information of the battery pack; and a solar component 53, configured to convert acquired solar energy into electric energy to charge the battery pack.

The solar component 53 is disposed in the battery pack to charge the battery pack by using electric energy converted from solar energy, and in outdoor applications of the battery pack, power loss of the battery pack can be reduced and the life of the battery pack can be extended.

It should be noted that the foregoing explanation to the embodiment of the method for displaying information of a battery pack performed on the side of the battery pack is also applicable to the battery pack of this embodiment, which is not described in detail herein.

The battery pack according to the embodiment of the present invention can establish wireless communication with the terminal through the wireless communications component, so that the controller may control the display component to automatically display status information of the battery pack when determining that a distance from the terminal is less than or equal to a first threshold. In this way, the status information of the battery pack can be displayed only if the terminal carried by the user approaches the battery pack. The operation manner is simple, convenient, and easy to implement, and user experience is improved.

In an exemplary embodiment, a terminal is further provided, including:

a memory, a processor, and a computer program stored in the memory and executable by the processor, where the program is executed by the processor to implement the method for displaying information of a battery pack as described in the embodiment on the side of the terminal.

After establishing wireless communication with the battery pack, the terminal according to the embodiment of the present invention may control the battery pack to display status information by sending an on-status information display instruction to the battery pack. In this way, the status information of the battery pack can be displayed only by sending an on-status information display instruction to the battery pack through the terminal. The operation manner is simple, convenient, and easy to implement, and user experience is improved.

In an exemplary embodiment, a computer-readable storage medium storing a computer program is further provided. The program is executed by a processor to implement the method for displaying information of a battery pack as described in the embodiment on the side of the battery pack, and/or the method for displaying information of a battery pack as described in the embodiment on the side of the terminal.

In an exemplary embodiment, a computer program product is further provided. When an instruction in the computer program product is executed by a processor, the method for displaying information of a battery pack as described in the embodiment on the side of the battery pack is performed, and/or the method for displaying information of a battery pack as described in the embodiment on the side of the terminal is performed.

In the descriptions of the specification, the descriptions about reference terms "an exemplary embodiment," "some embodiments," "an example," "a specific example," "some examples" or the like mean that specific features or characteristics described in combination with the embodiment(s) or example(s) are included in at least one embodiment or example of the present invention. In the specification, schematic representations of the foregoing terms do not have to be directed to the same embodiment or example. Moreover, the specific features or characteristics described may be combined in an appropriate manner in any one or more embodiments or examples. In addition, without contradiction, a person skilled in the art may merge and combine different embodiments or examples and features of the different embodiments or examples described in this specification.

The storage medium mentioned above may be a read-only memory (ROM), a magnetic disk, an optical disc or the like.

The embodiments of the present invention have been shown and described above. However, it should be understood that the foregoing embodiments are exemplary and cannot be construed as limitations to the present invention. A person of ordinary skill in the art can change, modify, replace, and alter the foregoing embodiments within the scope of the present invention.

What is claimed is:

1. A method for displaying information of a battery pack based on a mobile terminal, the battery pack being used to supply electric energy to an electric tool, wherein the method comprises:
    establishing wireless communication with the battery pack;
    acquiring status information of the battery pack; and
    determining a distance between the mobile terminal and the battery pack;
    in response to determining that the distance is less than or equal to a first threshold, displaying the status information on the mobile terminal in real time;
    in response to determining that the distance is greater than the first threshold and less than a second threshold, displaying the status information on the mobile terminal intermittently at a preset frequency; and
    in response to determining that the distance is greater than the second threshold, stopping to display the status information on the mobile terminal.

2. The method according to claim 1, wherein the status information of the battery pack comprises a remaining charge level of the battery pack, and displaying the status information on the mobile terminal comprises:
    displaying the remaining charge level of the battery pack on the mobile terminal.

3. The method according to claim 2, wherein displaying the remaining charge level of the battery pack on the mobile terminal comprises:
    representing the remaining charge level of the battery pack with a plurality of bars or with a percentage on the mobile terminal.

4. The method according to claim 1, wherein the status information of the battery pack comprises at least one of a temperature of the battery pack, a quantity of times of charge or discharge, and a remaining life of the battery pack.

5. The method according to claim 1, wherein:
    the status information of the battery pack comprises a remaining capacity of the battery pack,
    the remaining capacity is a remaining operating time and/or a quantity of remaining operations of repeating operation under a working condition according to a remaining charge level of the battery pack, and
    the method further comprises:
        acquiring, by the battery pack, load information of the electric tool connected to the battery pack during operation;
        calculating, by the battery pack, the remaining capacity of the battery pack according to the remaining charge level and the load information, and transmitting the remaining capacity to the mobile terminal; and
        displaying the remaining capacity on the mobile terminal.

6. The method according to claim 1, wherein the status information of the battery pack comprises a remaining operating time of the battery pack, and the method further comprises:
    acquiring remaining charge levels of the battery pack at regular intervals;

calculating a consumption rate of a charge level of the battery pack under a working condition, and calculating the remaining operating time of the battery pack; and displaying the remaining operating time of the battery pack on the mobile terminal.

7. The method according to claim 1, further comprising:

in response to determining that the mobile terminal disconnects the wireless communication from the battery pack, recording, by the battery pack, a current location and time information, and transmitting the current location and the time information to the mobile terminal.

8. The method according to claim 1, further comprising:

presetting a safe distance between the battery pack and the mobile terminal, and when the distance between the battery pack and the mobile terminal is greater than the safe distance, outputting a prompt message through the mobile terminal.

9. The method according to claim 1, wherein the battery pack is electrically connected to the electric tool, and the method further comprises:

acquiring, by the battery pack, attribute information of the electric tool;

transmitting, by the battery pack, the attribute information of the electric tool to the mobile terminal; and displaying the attribute information on the mobile terminal.

10. The method according to claim 9, further comprising:

sending, by the mobile terminal, an electric tool control parameter to the battery pack; and receiving, by the battery pack, the electric tool control parameter transmitted by the mobile terminal, and transmitting the electric tool control parameter to the electric tool connected to the battery pack, for controlling the electric tool.

11. The method according to claim 1, further comprising:

acquiring, by the mobile terminal, use data of the battery pack or the electric tool connected to the battery pack, and providing a user with a use recommendation according to the use data; and displaying the use recommendation on the mobile terminal.

12. The method according to claim 1, further comprising:

acquiring, by the mobile terminal, model or parameter information of the battery pack or the electric tool connected to the battery pack, and acquiring a purchase step of an accessory of the battery pack or the electric tool according to the model or parameter information; and displaying the purchase step on the mobile terminal.

13. The method according to claim 11, wherein acquiring, by the mobile terminal, the use data of the battery pack or the electric tool connected to the battery pack, and providing the user with the use recommendation according to the use data comprises:

acquiring, by the mobile terminal, the use data of the battery pack or the electric tool connected to the battery pack, and transmitting the use data to a cloud server; and analyzing, by the cloud server, the acquired use data, providing the user with the use recommendation, and transmitting the use recommendation to the mobile terminal.

14. The method according to claim 12, wherein acquiring, by the mobile terminal, model or parameter information of the battery pack or the electric tool connected to the battery pack, and acquiring the purchase step of the accessory of the battery pack or the electric tool according to the model or parameter information comprises:

acquiring, by the mobile terminal, the model or parameter information of the battery pack or the electric tool connected to the battery pack, and transmitting the model or parameter information to a cloud server; and analyzing, by the cloud server, an acquired model or parameter, acquiring the purchase step of the accessory of the battery pack or the electric tool, and transmitting the purchase step to the mobile terminal.

15. A method for displaying information of a battery pack, applied to a battery pack having a display component and a wireless communications component, wherein the method comprises:

establishing wireless communication with a terminal through the wireless communications component;

determining a distance between the battery pack and the terminal;

in response to determining that the distance is less than or equal to a first threshold, controlling the display component to automatically display status information of the battery pack in real time;

in response to determining that the distance is greater than the first threshold and less than a second threshold, controlling the display component to display the status information of the battery pack intermittently at a preset frequency; and in response to determining that the distance is greater than the second threshold, controlling the display component to stop displaying the status information of the battery pack.

16. The method according to claim 15, wherein after establishing wireless communication with a terminal through the wireless communications component, the method further comprises:

sending the status information of the battery pack to the terminal through the wireless communications component.

17. The method according to claim 15, wherein after establishing wireless communication with the terminal through the wireless communications component, the method further comprises:

acquiring configuration information sent by the terminal; and configuring the battery pack according to the configuration information.

18. The method according to claim 15, wherein after establishing wireless communication with the terminal through the wireless communications component, the method further comprises:

acquiring attribute information of an electric tool electrically connected to the battery pack; and sending the attribute information of the electric tool to the terminal.

19. The method according to claim 18, wherein after sending the attribute information of the electric tool to the terminal, the method further comprises:

acquiring an electric tool control parameter sent by the terminal; and sending the electric tool control parameter to the electric tool electrically connected to the battery pack.

* * * * *